(12) United States Patent
Hilf et al.

(10) Patent No.: US 8,987,380 B2
(45) Date of Patent: *Mar. 24, 2015

(54) FUNCTIONAL MATERIALS WITH CONTROLLABLE VISCOSITY

(75) Inventors: Stefan Hilf, Rodenbach (DE); Friedrich Georg Schmidt, Haltern am See (DE); Andre Hennig, Ingelheim (DE); Simon Krause, Aschaffenburg (DE); Christopher Barner-Kowollik, Stutensee (DE); Andrew John Inglis, Blakehurst (AU); Leena Nebhani, Rajasthan (IN)

(73) Assignee: Evonik Roehm GmbH, Darmstadt (DE)

( * ) Notice: Subject to any disclaimer, the term of this patent is extended or adjusted under 35 U.S.C. 154(b) by 260 days.

This patent is subject to a terminal disclaimer.

(21) Appl. No.: 13/519,169

(22) PCT Filed: Jan. 4, 2011

(86) PCT No.: PCT/EP2011/050041
§ 371 (c)(1),
(2), (4) Date: Jun. 26, 2012

(87) PCT Pub. No.: WO2011/101175
PCT Pub. Date: Aug. 25, 2011

(65) Prior Publication Data
US 2012/0289657 A1    Nov. 15, 2012

(30) Foreign Application Priority Data
Feb. 16, 2010   (DE) .......................... 10 2010 001 992

(51) Int. Cl.
| | | |
|---|---|---|
| C08L 33/12 | (2006.01) | |
| C08F 120/10 | (2006.01) | |
| C08L 45/00 | (2006.01) | |
| C08L 33/08 | (2006.01) | |
| C08L 81/00 | (2006.01) | |
| C09J 4/00 | (2006.01) | |
| C08F 8/00 | (2006.01) | |
| C08F 8/26 | (2006.01) | |
| C08F 8/34 | (2006.01) | |
| C08G 81/02 | (2006.01) | |
| C08J 3/24 | (2006.01) | |
| C09D 11/00 | (2014.01) | |
| C08K 5/38 | (2006.01) | |

(52) U.S. Cl.
CPC ... *C09J 4/00* (2013.01); *C08F 8/00* (2013.01); *C08F 8/26* (2013.01); *C08F 8/34* (2013.01); *C08G 81/02* (2013.01); *C08J 3/246* (2013.01); *C09D 11/00* (2013.01); *C08K 5/38* (2013.01)
USPC ............. 525/186; 525/55; 525/188; 525/211; 525/535; 525/330.4

(58) Field of Classification Search
CPC ......... C08L 33/12; C08L 79/04; C08L 45/00; C08L 33/08; C08L 81/00; C08F 120/10
USPC ................. 525/186, 55, 188, 211, 535, 330.4
See application file for complete search history.

(56) References Cited

U.S. PATENT DOCUMENTS

| | | | |
|---|---|---|---|
| 6,933,361 | B2 | 8/2005 | Wudl et al. |
| 2004/0014933 | A1* | 1/2004 | Wudl et al. .................... 528/365 |
| 2005/0067373 | A1 | 3/2005 | Brock et al. |
| 2013/0323993 | A1 | 12/2013 | Schmitt et al. |
| 2014/0163165 | A1 | 6/2014 | Schmidt et al. |

FOREIGN PATENT DOCUMENTS

| | | |
|---|---|---|
| EP | 2 166 030 | 3/2010 |
| JP | 2000 1529 | 1/2000 |
| JP | 2001-520660 A | 10/2001 |
| WO | 2010 144774 | 12/2010 |
| WO | WO 2011/101176 A1 | 8/2011 |
| WO | WO 2012/031824 A1 | 3/2012 |
| WO | WO 2012/065786 A1 | 5/2012 |

OTHER PUBLICATIONS

Inglis et al. "Ultrafast Click Conjugation of Macromolecular Building Blocks at Ambient Temperature", Comminication, vol. 48, Issue 13, pp. 2411-2414, Mar. 16, 2009.*
U.S. Appl. No. 14/127,380, filed Dec. 18, 2013, Schmidt, et al.
U.S. Appl. No. 13/820,621, filed Mar. 4, 2013, Schmidt, et al.
Combined Chinese Office Action and Search Report issued Mar. 11, 2014, in Chinese Patent Application No. 201180006457.8 with English translation.
Andrew J. Inglis, et al., "Ultrafast Click Conjugation of Macromolecular Building Blocks at Ambient Temperature", Angew. Chem. Int. Ed., vol. 48, Issued 13, Mar. 16, 2009, pp. 2411-2414.
U.S. Appl. No. 13/988,147, filed May 17, 2013, Hilf, et al.
International Search Report Issued Feb. 25, 2011 in PCT/EP11/50041 Filed Jan. 4, 2011.
U.S. Appl. No. 13/577,932, filed Aug. 9, 2012, Schmidt, et al.
International Preliminary Report on Patentability and Written Opinion of the International Searching Authority issued Aug. 30, 2012, in PCT/EP2011/050041 (with English-language translation).
U.S. Appl. No. 14/360,442, filed May 23, 2014, Schmidt, et al.
U.S. Appl. No. 14/363,055, filed Jun. 5, 2014, Schmidt, et al.
Office Action issued Jun. 9, 2014 in Japanese Patent Application No. 2012-553235 (with English language translation).

* cited by examiner

*Primary Examiner* — Michael M Bernshteyn
(74) *Attorney, Agent, or Firm* — Oblon, McClelland, Maier & Neustadt, L.L.P.

(57) ABSTRACT

The present invention relates to an innovative method for controlling the viscosity of, for example, adhesives or coating formulations. The method for controlling viscosity allows very rapid thermoplastic curing of a formulation even at room temperature and a significant reduction in the viscosity at higher temperatures, thereby regaining the capacity for simple processing and allowing, for example, the originally bonded substrates to be separated from one another again with ease. A particular aspect in this context is that a plurality of cycles of thermoplastic curing and a significant reduction in the viscosity are possible with the present system.

20 Claims, 1 Drawing Sheet

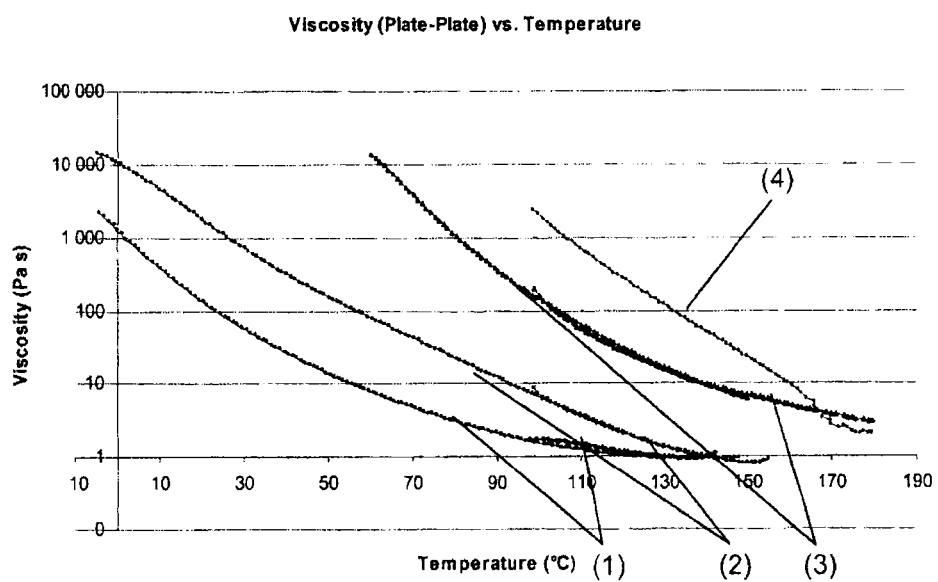

FUNCTIONAL MATERIALS WITH CONTROLLABLE VISCOSITY

CROSS REFERENCE TO RELATED APPLICATION

This application is a 371 of PCT/EP2011/050041, filed on Jan. 4, 2011, and claims priority to German Patent Application 10 2010 001 992.5, filed on Feb. 16, 2010.

FIELD OF THE INVENTION

The present invention relates to an innovative method for controlling the viscosity of, for example, adhesives or coating formulations.

The method for controlling viscosity allows very rapid thermoplastic curing of a formulation even at room temperature and significant reduction in the viscosity at higher temperatures, thereby regaining the capacity for simple processing and allowing the originally bonded substrates to be separated from one another again with ease. A particular aspect in this context is that a plurality of cycles of thermoplastic curing and significant reduction in the viscosity are possible with the present system.

PRIOR ART

Methods for the reversible linking of polymers are of great interest for a broad field of applications. In adhesive applications, for example, diverse possibilities for the automotive industry or the semiconductors industry are described. In the context of the construction of machines, precision mechanical devices, or in the building industry as well, however, such adhesives are of interest. Besides adhesive applications, reversibly linkable polymers may also be of interest in sealants, in coating materials such as varnishes or paints, or in the production of mouldings. DE 198 32 629 and DE 199 61 940 describe processes where epoxy-, urea-, (meth)acrylate- or isocyanate-based adhesives are thermally decomposed. For this purpose, the adhesive formulation from DE 199 61 940 comprises a thermally unstable substance which is activated on heating. The adhesive layer in DE 198 32 629 is destroyed by a particularly high energy input. In both cases, deactivation of the adhesive layer is irreversible.

US 2005/0159521 and US 2009/0090461 describe an adhesive system which is crosslinked free-radically by exposure to actinic radiation and is destroyed by ultrasound. This process too, irreversibly, can no longer be implemented after one bonding cycle.

In EP 2 062 926, thermally labile, sterically hindered urea groups are incorporated in the chains of a polyurethane for adhesive applications; introduction of thermal energy causes destruction thereof, thereby reducing the adhesive bonding effect sufficiently to part the bond.

US 2009/0280330 describes an adhesive system which can apparently be used more than once and which has a two-layer construction. One layer is a shape memory layer, which may be thermally flexible or cured. The other layer is a dry adhesive, having different adhesive strengths as a function of its structure. Problems of such a system, however, are the two-layer structure, which is laborious to construct, and the anticipated residual tack after heating of the shape memory layer.

For a number of years, primarily within academia, methods for constructing block polymers have been researched under the generic heading of "click chemistry". In this chemistry, two different homopolymers with linkable end groups are combined with one another and are joined to one another by means, for example, of a Diels-Alder reaction, Diels-Alder-analogous reaction or other cycloaddition. The objective of this reaction is to construct thermally stable, linear and possibly high molecular mass polymer chains. Inglis et al. (Macromolecules 2010, 43, pp. 33-36), for example, describe, for this purpose, polymers with cyclopentadienyl end groups which are obtainable from polymers prepared by means of ATRP. These cyclopentadiene groups are able to react very rapidly in hetero-Diels-Alder reactions with polymers which carry electron-deficient dithioesters as end groups (Inglis et al., Angew. Chem. Int. Ed. 2009, 48, pp. 2411-2414).

The use of monofunctional RAFT polymers for linking with monofunctional polymers having a dihydrothiopyran group by way of a hetero-Diels-Alder reaction is found in Sinnwell et al. (Chem. Comm. 2008, 2052-2054). This method can be used to realize AB diblock copolymers. Rapid variants of this hetero-Diels-Alder linkage for the synthesis of AB block copolymers with a dithioester group which is present after a RAFT polymerization and with a dienyl end group are described in Inglis et al. (Angew. Chem. Int. Ed. 2009, 48, pp. 2411-14) and in Inglis et al. (Macromol. Rapid Commun. 2009, 30, pp. 1792-98). The analogous preparation of multiarm star polymers is found in Sinnwell et al. (J. Pol. Sci.: Part A: Pol. Chem. 2009, 47, pp. 2207-13).

U.S. Pat. No. 6,933,361 describes a system for producing transparent mouldings that can be repaired simply. The system is composed of two polyfunctional monomers which polymerize by means of a Diels-Alder reaction to form a highly dense network. One functionality in this system is a maleimide and the other functionality is a furan. The thermal switching of a highly dense network of this kind is used for its repair. Crosslinking takes place at temperatures above 100° C. The partial reverse reaction occurs at even higher temperatures.

In Syrett et al. (Polym. Chem. 2010, DOI: 10.1039/b9py00316a), star polymers are described for use as flow improvers in oils. These polymers have self-healing properties that can be controlled by means of a reversible Diels-Alder reaction. For this purpose, monofunctional polymethacrylate chains are combined with polymethacrylates which in the middle of the chain, as a fragment of the initiator used, possess a group which can be used in a reversible Diels-Alder reaction.

OBJECT

An object of the present invention is to provide a new method for controlling viscosity which can be used in reverse and used in different applications and across a broad formulation spectrum.

A particular object is to provide a reversible usable method which can be switched a number of times, i.e. at least five times, without substantial loss of properties.

Furthermore, the object exists of providing a reversible usable method which can be activated very rapidly at low temperatures and can be deactivated again under conditions which are benign for the formulation and any coated substrates.

Further objects, not stated explicitly, will become apparent from the overall context of the description, claims and examples hereinbelow.

SOLUTION

The objects have been achieved through development of an innovative reversible switchable mechanism which can be used for different kinds of polymers independently of the formulating constituents such as binders. With the mechanism, new, reversibly switchable formulations are also provided. Surprisingly it has been found that the stated objects can be achieved by means of a formulation which can be switched by means of a Diels-Alder reaction or a hetero-Diels-Alder reaction. The switching of the invention takes place through the coupling of polymers and/or oligomers and/or low-molecular compounds to form higher-molecular polymer chains under a first condition, such as, for example, at a first, relatively low temperature. The switching of the invention further includes the undoing of these couplings under a second condition, such as, for example, at a second, higher temperature.

The formulations of the invention comprise a component A, which has two dienophilic double bonds, and a component B, which has two diene functionalities. In addition, at least one of the components, A or B, must be present as a polymer.

Where the components A and B are each a polymer, these polymers may be different polymers or may be polymers which are the same, differing only in respect of the functional groups.

The polymers may be polyacrylates, polymethacrylates, polystyrenes, copolymers of acrylates, methacrylates and/or styrenes, polyacrylonitrile, polyethers, polyesters, polylactic acids, polyamides, polyesteramides, polyurethanes, polycarbonates, amorphous or partially crystalline poly-α-olefins, EPDM, EPM, hydrogenated or unhydrogenated polybutadienes, ABS, SBR, polysiloxanes and/or block, comb and/or star copolymers of these polymers. These star polymers may have more than 30 arms. The composition of the arms may vary and they may be composed of different polymers. These arms in turn, as well, may have branches. The comb polymers may have a block structure and may have variable comb arms.

The (meth)acrylates notation used below stands for alkyl esters of acrylic acid and/or of methacrylic acid.

A particular aspect of the invention is that the formulation is switchable at room temperature and the couplings can be undone to an extent of at least 50% at a higher temperature. More particularly the formulation at room temperature is in the form of high-molecular polymer chains. At a higher temperature, these high-molecular polymer chains are broken back down to the reactants and/or to shorter chains segments to an extent of at least 50%. This restores a thermoplastic processability, for the parting of a bond or reworking of a moulding compound, for example.

The dienophile is preferably a compound having a carbon-sulphur double bond, and the preferred crosslinking reaction, accordingly, is a hetero-Diels-Alder reaction. With particular preference the dienophile is a dithioester. With very particular preference the dienophile is a compound having the structure

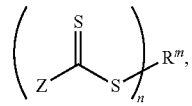

where Z is a strongly electron-withdrawing group, $R^m$ is a divalent organic group, preferably based on branched or linear alkylic, aromatic or a combination of alkylic and aromatic difunctional alcohols, difunctional halogenated compounds, difunctional carboxylic acids or difunctional amines. Alternatively $R^m$ may also be a polymer. In this case, the electron-withdrawing groups are preferably at the two ends of the chain.

In one preferred embodiment the group Z is a 2-pyridyl group, a phosphoryl group or a sulphonyl group. Also contemplated are cyano or trifluoromethyl groups, and also any other group Z which very strongly reduces the electron density of the C=S double bond and hence allows a rapid Diels-Alder reaction.

Surprisingly it has been found that these systems link very rapidly even at room temperature, with optional addition of a catalyst. Equally surprisingly it has been found that these resulting long-chain thermoplastics can be returned into a short-chain thermoplastic again, simply and almost completely, even at very low temperatures of, for example, somewhat over 80° C. Moreover, it has been found, very surprisingly, that further linking to form a long-chain thermoplastic can take place thereafter, without further addition of one or other of component and/or catalyst, as for example by pure cooling. Furthermore, it is a particularly surprising effect that these cycles of linking and conversion back into a short-chain thermoplastic can be carried out at least three times, preferably at least five times, without substantial loss of properties of the formulations.

In one preferred embodiment, component B is a difunctional polymer which is prepared by means of atom transfer radical polymerization (ATRP). In this case, functionalization with the diene groups takes place by means of a polymer-analogous substitution, or one carried out during termination, of terminal halogen atoms. This substitution may take place, for example, by addition of mercaptans functionalized with diene groups.

In the same preferred embodiment it is possible as component A to use a low molecular mass organic compound having 2 dithioester groups, and having, in accordance with the above embodiment, a group Z which strongly reduces the electron density of the C=S double bond.

A further aspect of the present invention is the process for reversible crosslinking. When this process is implemented, a formulation composed of at least two different components A and B is linked at room temperature by means of a Diels-Alder reaction or a hetero-Diels-Alder reaction. In a second process step, at a higher temperature, at least 50%, preferably at least 90% and more preferably at least 99% of the links are undone again by means of a retro-Diels-Alder reaction or a retro-hetero-Diels-Alder reaction.

As a result of the formation of long-chain thermoplastics, there is an increase in the viscosity of the formulation, up to the point of an interlooping-induced physical network with thermoset or elastomeric properties. An advantage of the present mechanism is that, in the course of this curing, the reversibly switchable formulation, unlike prior-art systems, at the same time retains thermoplastic properties. Moreover, the advantage of a reversibly curing but not crosslinking system is that on decoupling, or "switching back", no gel particles remain, in the form of constituents that have not been "de-networked". For the process of the invention for reversible switching between two different thermoplastic states, accordingly, a higher number of possible cycles is anticipated than in the case of a reversibly crosslinking system.

The term "formulation" and all of the percentages associated with it relate in this case only to components A and B. Further formulating constituents, such as those, for example, which may be added in a coating or adhesive composition, are disregarded in this consideration. In the text below, the expression "formulation" in the context of this specification describes exclusively the components A and B and also an optional crosslinking catalyst. The expression "composition", in contrast, comprises components added additionally as well as the formulation. These additional components may be adjuvants selected specifically for the particular application, such as fillers, pigments, additives, compatibilizers, cobinders, plasticizers, impact modifiers, thickeners, defoamers, dispersing additives, rheology improvers, adhesion promoters, scratch resistance additives, catalysts or stabilizers, for example.

In accordance with the formulation already described, first components A and B, and optional further adjuvants, are combined in the process. Components A and/or B comprise at least one polymer from the list given earlier on above.

The linking reaction may take place at room temperature within 10 minutes, preferably within 5 minutes, more preferably within 2 minutes, and very preferably within one minute. In order to accelerate the linking it is possible to add a catalyst after components A and B have been mixed. These catalysts are generally strong acids such as trifluoroacetic acid or sulphuric acid, or strong Lewis acids such as boron trifluoride, zinc dichloride, titanium dichloride diisopropoxide or aluminium trichloride, for example.

In one alternative embodiment, linking may also be accelerated without a catalyst, by thermal means, for example. In that case the activation temperature is below the temperature needed for the retro-(hetero)-Diels-Alder reaction.

In another alternative embodiment, the formulation, independently of the activation of the linking reaction, comprises a further catalyst that lowers the activation temperature of the retro-Diels-Alder reaction or of the retro-hetero-Diels-Alder reaction. These catalysts may be, for example, iron or an iron compound.

The formulations and processes of the invention can be used in a wide variety of fields of application. The list below indicates certain preferred fields of application by way of example, without confining the invention in this respect in any form whatsoever. Such preferred fields of application are adhesives, sealants, moulding compounds, varnishes, paint, coatings, composite materials, inks or oil additives such as flow improvers.

These inks are, for example, compositions which are applied thermally and cure on the substrate. If conductive oligomers are used or additives for generating conductivity in general, an electrically conducting ink is obtained which can be processed, for example, by bubble-jet methods. Examples from the fields of application of varnishes, coatings and paint are compositions which in the low-viscous state are able to wet porous materials, for example, to particularly good effect and which, following the linking reaction, produce highly cohesive materials.

Similar characteristics are of importance for adhesives, which ought to have high cohesion and are nevertheless intended readily to wet the surfaces of the materials to be bonded. A further application in the adhesive bonding area is, for example, a join which is needed only temporarily and must later be undone, of the kind that may occur in various production operations, for example, in automotive engineering or in mechanical engineering.

Another conceivable application is the bonding of components which, viewed over the lifetime of the product as a whole, are highly likely to be switched, and which therefore ought to be removable again very easily and without residue. One example of an application of this kind is the bonding of car windscreens.

Other examples are production operations in the fields of electronics, information technology, in the construction industry or in the furniture industry. Another application of interest for low-temperature decoupling of the invention might lie in the field of medical technology, particularly in the area of orthopaedic technology.

One particular example of adhesives or sealants is their used in food packaging which opens or can be undone autonomically during heating, such as in a microwave, for example.

An example of applications in the rapid prototyping sector for the crosslinking and decrosslinking materials described herein can be found in the area of FDM (fused deposition modelling) or in 3D printing by ink-jet methods with low-viscosity melts.

EXAMPLES

The number-average molecular weights $M_n$ and the polydispersity index PDI of the polymers were determined by means of GPC (gel permeation chromatography). The measurements were carried out using a Polymer Laboratories Inc. PL-GPC 50 Plus at 30° C. in tetrahydrofuran (THF) against a series of polystyrene standards (approximately 200 to $1 \cdot 10^6$ g/mol).

The NMR analyses were carried out on a Bruker AM 400 MHz spectrometer.

The rheological measurements take place as plate-plate measurements in accordance with ISO6721 part 10, temperature ramp=2 K/min. The measurement points that have been filled in correspond to a measurement range from −5° C. to +150° C., while the measurement points which have not been filled in correspond to a measurement methodology with a measurement range from 100° C. to 200° C.

Example 1

Synthesis of bis(bromo)polymethyl methacrylates 50 equivalents of methyl methacrylate (MMA), 1 equivalent of 1,2-bis(bromoisobutyryloxy)ethane, 0.105 equivalent of copper(I) bromide, 0.0125 equivalent of copper(II) bromide and 0.25 equivalent of 2,2'-bipyridine are placed in a 1 l three-neck flask with magnetic stirrer, nitrogen inlet and reflux condenser. Acetone is added to the mixture in an amount sufficient to give 500 ml of a 50% strength (by volume) solution. Oxygen present is removed by passing nitrogen through the solution for 40 minutes. The mixture is then heated to 50° C. in an oil bath under nitrogen. Polymerization is terminated after 2 hours by cooling in an ice bath and admission of atmospheric oxygen. The copper catalyst is removed by filtration on a short column packed with neutral alumina. The bromine-terminated poly(methyl) methacrylate ($PMMA-Br_2$) is precipitated twice from cold hexane, being dissolved in a little acetone in-between. The molecular weight is determined by means of GPC (THF): $M_n=3500$ g·mol$^{-1}$, PDI=1.2.

Example 2

Synthesis of bis(cyclopentadienyl)polymethyl methacrylate 1 equivalent of $PMMA-Br_2$ from Stage 1, 12 equivalents of sodium iodide, 4 equivalents of tributylphosphane and 8 equivalents of nickelocene are dissolved in dried tetrahydrofuran (THF) under nitrogen in a 50 ml three-neck flask with magnetic stirrer, reflux condenser and dropping funnel, to form 25 ml of a solution which is 0.1 molar with respect to the polymer. The solution is stirred at room temperature for 12 hours, and the reaction solution is then purified by column chromatography on a short column packed with basic alumina. The cyclopentadienyl-terminated poly(methyl) methacrylate (PMMA-Cp$_2$) is precipitated twice from cold hexane. The double functionalization with cyclopentadienyl groups, which has taken place to an extent of more than 950, is detected by ESI-MS. The m/z values are in each case approximately 29.6 mol$^{-1}$ smaller than the measurement for the product from Example 1.

Example 3

Synthesis of Br-functional poly(n-butyl acrylate)

80 equivalents of n-butyl acrylate (nBA), 1 equivalent of 1,2-bis(bromoisobutyryloxy)ethane, 0.105 equivalent of copper(I) bromide, 0.0125 equivalent of copper(II) bromide and 0.25 equivalent of 2,2'-bipyridine are placed in a 1 l three-neck flask with magnetic stirrer, nitrogen inlet and reflux condenser. Acetone is added to the mixture in an amount sufficient to give 500 ml of a 50% strength by volume solution. Oxygen present is removed by passing nitrogen through the solution for 40 minutes. The mixture is then heated to 60° C. in an oil bath under nitrogen. Polymerization is terminated after 3 hours by cooling to room temperature and admission of atmospheric oxygen. The copper catalyst is removed by filtration on a short column packed with neutral alumina. The bromine-terminated poly(n-butyl acrylate) is recovered by evaporation of the solvent. The molecular weight is determined by means of GPC (THF): $M_n$=12000 g·mol$^{-1}$, PDI=1.3.

Example 4

Synthesis of Br-functional poly(isobornyl methacrylate-co-butyl acrylate)

32 equivalents of isobornyl acrylate (iBoMA), 25 equivalents of n-butyl acrylate (nBA), 1 equivalent of 1,2-bis(bromoisobutyryloxy)ethane, 0.105 equivalent of copper(I) bromide, 0.0125 equivalent of copper(II) bromide and 0.25 equivalent of 2,2'-bipyridine are placed in a 1 l three-neck flask with magnetic stirrer, nitrogen inlet and reflux condenser. Acetone is added to the mixture in an amount sufficient to give 500 ml of a 50% strength by volume solution. Oxygen present is removed by passing nitrogen through the solution for 40 minutes. The mixture is then heated to 60° C. in an oil bath under nitrogen. Polymerization is terminated after 3 hours by cooling to room temperature and admission of atmospheric oxygen. The copper catalyst is removed by filtration on a short column packed with neutral alumina. The bromine-terminated copolymer is recovered by evaporation of the solvent. The molecular weight is determined by means of GPC (THF): $M_n$=10000 g·mol$^{-1}$, PDI=1.3.

Example 5

Synthesis of bis(cyclopentadienyl)poly(n-butyl acrylate)

1 equivalent of polymer from Example 3, 6 equivalents of sodium iodide, 2 equivalents of tributylphosphane and 2 equivalents of nickelocene are dissolved in acetone under nitrogen in a 50 ml three-neck flask with magnetic stirrer, reflux condenser and dropping funnel, to form 25 ml of a solution which is 0.1 molar with respect to the polymer. The solution is stirred at room temperature for 12 hours, and the reaction solution is then purified by column chromatography on a short column packed with basic alumina. The cyclopentadienyl-terminated polymer is precipitated twice from cold ethanol by addition of water. The conversion of more than 90% of the Br end groups to Cp end groups was detected by nuclear magnetic resonance spectroscopy.

Example 6

Synthesis of bis(cyclopentadienyl)poly(isobornyl methacrylate-co-butyl acrylate)

The reaction of the polymer from Example 4 takes places in the same way as for Example 5. The conversion was likewise more than 90%.

Example 7

Synthesis of phosphoric dithioester (PDI)

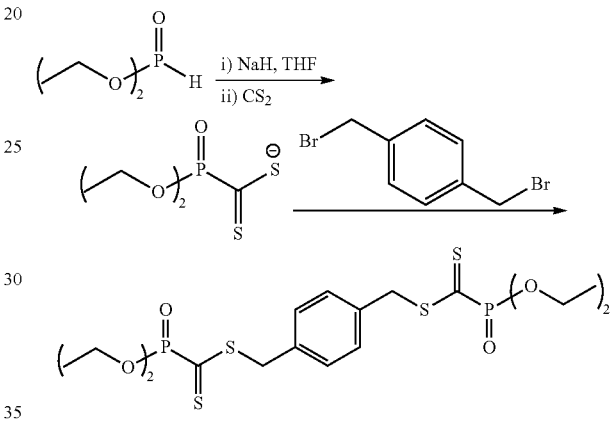

A solution of diethyl phosphite (5.3 ml, 41.2 mmol) in dry THF (20 ml) is added dropwise to a suspension of sodium hydride (1.64 g, 41.2 mmol) in THF (40 ml) in a two-neck flask with reflux condenser and magnetic stirrer, the addition taking place slowly and under a nitrogen atmosphere.

When the evolution of hydrogen is at an end, the mixture is refluxed for 10 minutes. After cooling to room temperature, the reaction mixture is cooled further in a refrigeration bath of acetone and liquid nitrogen at −20° C., during which carbon disulphide (12.26 ml, 203.6 mmol) is added dropwise.

After the end of the addition, the mixture is thawed by warming to room temperature over 30 minutes. This mixture is subsequently admixed dropwise at room temperature with a solution of 1,4-bis(bromomethylbenzene) (5.44 g) in dry THF (40 ml) and stirred for a further three hours. Then 200 ml of hexane are added and the mixture is filtered. The violet filtrate is collected and the solvents are removed under reduced pressure. The product is purified by column chromatography over silica, with hexane and ethyl acetate as eluents. The second violet fraction is collected as the product fraction and is freed from solvent. The purity according to nuclear magnetic resonance spectroscopy is >95%.

$^1$H NMR (250 MHz, CDCl$_3$, 25° C.): δ=7.20 (s, 4H), 4.40 (s, 4H), 4.30-4.11 (m, 8H), 1.27 (t, J=7 Hz, 12H).

Example 8

Reaction with Dithioester Linker (PDI)

With stirring, a 50% strength by weight solution of one part of Cp-functionalized polymer from Example 5 admixed with one part of the diothioester compound form Example 7 in dichloromethane is prepared, giving 20 ml of the solution. The mixture is stirred at room temperature for an hour and then the solvent is removed under reduced pressure.

Example 9

Reaction with BMI Linker

The polymer from Example 6 is prepared by stirring a 50% strength by weight solution of one part of Cp-functionalized polymer admixed with one part of the bismaleinimide in dichloromethane, giving 20 ml of the solution. The mixture is admixed with one part of $ZnCl_2$ and stirred at room temperature for 2 hours, after which the solvent is removed under reduced pressure.

Labelling of the Drawing FIG. 1:

FIG. 1 shows the relationship between viscosity and temperature, via the plate-plate viscosity measurement described above. It contains the following individual curves:
(1) material from Example 5
(2) material from Example 8
(3) material from Example 6
(4) material from Example 9

The effect of the switchable viscosity is apparent in the measurement curves for the viscosity of the materials over the temperature range shown. The measurement curves of Examples 5 and 6 represent the non-linked low-molecular polymers of Examples 8 and 9. Apparent is the successful chain linking of the materials in Examples 8 and 9, at a viscosity increased by a factor of 10 at the beginning of the measurement curves at lower temperatures. This viscosity difference disappears starting at the temperature from which the retro-HDA reaction occurs, i.e., the chain linkages formed are broken. From this point on, there is a disproportionate reduction in the viscosity of the polymers, until they reach the viscosity of the starting materials, Examples 5 and 6.

The invention claimed is:

1. A formulation comprising:
   a component A which has two dienophilic double bonds, at least one of which bonds is a carbon-sulphur double bond; and
   a component B which has two diene functionalities, wherein:
   component A, B, or both, is a polymer, and
   the formulation is reversibly switchable at room temperature by means of a Diels-Alder reaction or a hetero-Diels-Alder reaction.

2. The formulation of claim 1, wherein component A is a dithioester.

3. The formulation of claim 2, wherein component A has a structure

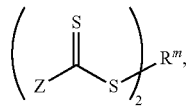

where Z is an electron-withdrawing group and $R^m$ is a divalent organic group or a polymer.

4. The formulation of claim 3, wherein Z is a 2-pyridyl group.

5. The formulation of claim 1, component A, B, or both, is a polymer, which are identical to, or different from, each other.

6. The formulation of claim 1, wherein each polymer for component A, B, or both is at least one selected from the group consisting of a polyacrylate a polymethacrylate, a polystyrene, a copolymer of an acrylate, a copolymer of a methacrylate, a copolymer of styrene, polyacrylonitrile, a polyether, a polyester, a polylactic acid, a polyamide, a polyesteramide, a polyurethane, a polycarbonate, an amorphous poly-α-olefin, a partially crystalline poly-α-olefin, EPDM, EPM, a hydrogenated polybutadiene, an unhydrogenated polybutadiene, ABS, SBR, a polysiloxane, a block copolymer of one of these polymers, a comb copolymer of one of these polymers and a star copolymer of one of these polymers.

7. The formulation of claim 1, wherein component B is a difunctional polymer obtained by atom transfer radical polymerization, wherein functionalization with the diene groups occurred by substitution of terminal halogen atoms.

8. The formulation of claim 3, wherein component A is a low molecular mass organic compound wherein Z is a 2-pyridyl group, a phosphoryl group or a sulphonyl group.

9. A process for reversible switching, comprising coupling the formulation according to claim 1 by a Diels-Alder reaction or hetero-Diels-Alder reaction at room temperature with an increase in molecular weight, wherein at least 50% of the couplings are undone at a higher temperature by a retro-Diels-Alder reaction or retro-hetero-Diels-Alder reaction.

10. A process for reversible switching, wherein the formulation of claim 5 is coupled by a Diels-Alder reaction or hetero-Diels-Alder reaction at room temperature with an increase in molecular weight, and at a higher temperature at least 50% of the couplings are carried out by a retro-Diels-Alder reaction or retro-hetero-Diels-Alder reaction.

11. The process of claim 9, wherein the increase in molecular weight occurs within 2 minutes after a mixing of components A and B.

12. The process of claim 9, wherein the increase in molecular weight occurs within 2 minutes after a mixing of components A and B with a catalyst.

13. The formulation of claim 1, wherein both dienophilic double bonds are carbon-sulphur double bonds.

14. The formulation of claim 3, wherein $R^m$ is a divalent organic group.

15. The formulation of claim 3, wherein $R^m$ is a polymer.

16. The formulation of claim 15, wherein the electron-withdrawing groups are at two different ends of the polymer.

17. The formulation of claim 3, wherein Z is a 2-pyridyl group.

18. The formulation of claim 3, wherein Z is a phosphoryl group.

19. The formulation of claim 3, wherein Z is a sulphonyl group.

20. The formulation of claim 3, wherein Z is a cyano group or a trifluoromethyl group.

* * * * *